(12) United States Patent
Glover et al.

(10) Patent No.: US 8,419,067 B2
(45) Date of Patent: Apr. 16, 2013

(54) EXTENSIBLE RESTRAINT STRAP FOR AN OCCUPANT-RESTRAINT SYSTEM IN A VEHICLE

(75) Inventors: Richard Glover, Greenwood, IN (US);
Stephen Oltman, Hope, IN (US);
Richard E. McVicker, Indianapolis, IN (US)

(73) Assignee: Cosco Management, Inc., Wilmington, DE (US)

( * ) Notice: Subject to any disclaimer, the term of this patent is extended or adjusted under 35 U.S.C. 154(b) by 1754 days.

(21) Appl. No.: 11/482,248

(22) Filed: Jul. 7, 2006

(65) Prior Publication Data

US 2007/0046014 A1    Mar. 1, 2007

Related U.S. Application Data

(60) Provisional application No. 60/697,699, filed on Jul. 8, 2005.

(51) Int. Cl.
*A62B 35/00* (2006.01)
(52) U.S. Cl.
USPC .................. 280/801.2; 280/808; 297/479

(58) Field of Classification Search ................. 280/808, 280/804, 801.2; 297/469, 474, 479, 473; 24/32, 37
See application file for complete search history.

(56) References Cited

U.S. PATENT DOCUMENTS

| 1,758,948 | A | | 5/1930 | Helm |
| 3,936,204 | A | | 2/1976 | Jennrich |
| 4,306,735 | A | | 12/1981 | Pfeiffer et al. |
| 4,371,193 | A | * | 2/1983 | Takada ........................ 280/806 |
| 5,114,001 | A | * | 5/1992 | Anderson ................. 198/844.2 |
| 5,845,372 | A | * | 12/1998 | Smith et al. .................... 24/168 |
| 6,749,260 | B2 | | 6/2004 | Abel |

OTHER PUBLICATIONS

International Search Report for PCT/US 06/26604, dated Jul. 26, 2007.

* cited by examiner

*Primary Examiner* — Paul N Dickson
*Assistant Examiner* — Timothy Wilhelm
(74) *Attorney, Agent, or Firm* — Barnes & Thornburg LLP

(57) ABSTRACT

An occupant-restraint system is provided for use in a vehicle. The system includes an extensible restraint strap and a mechanism for increasing the length of the extensible strap during sudden vehicle stoppage or slowdown.

35 Claims, 10 Drawing Sheets

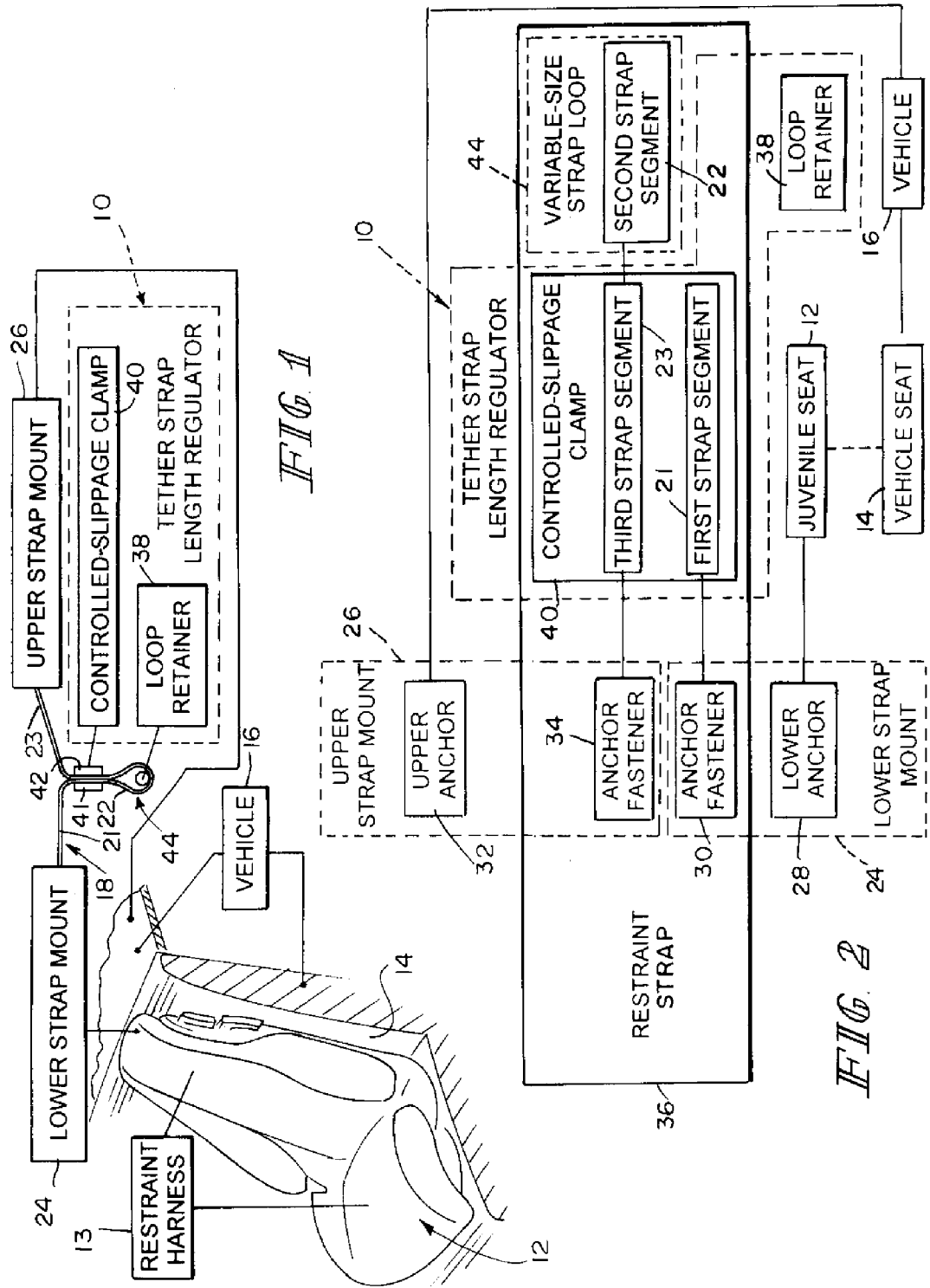

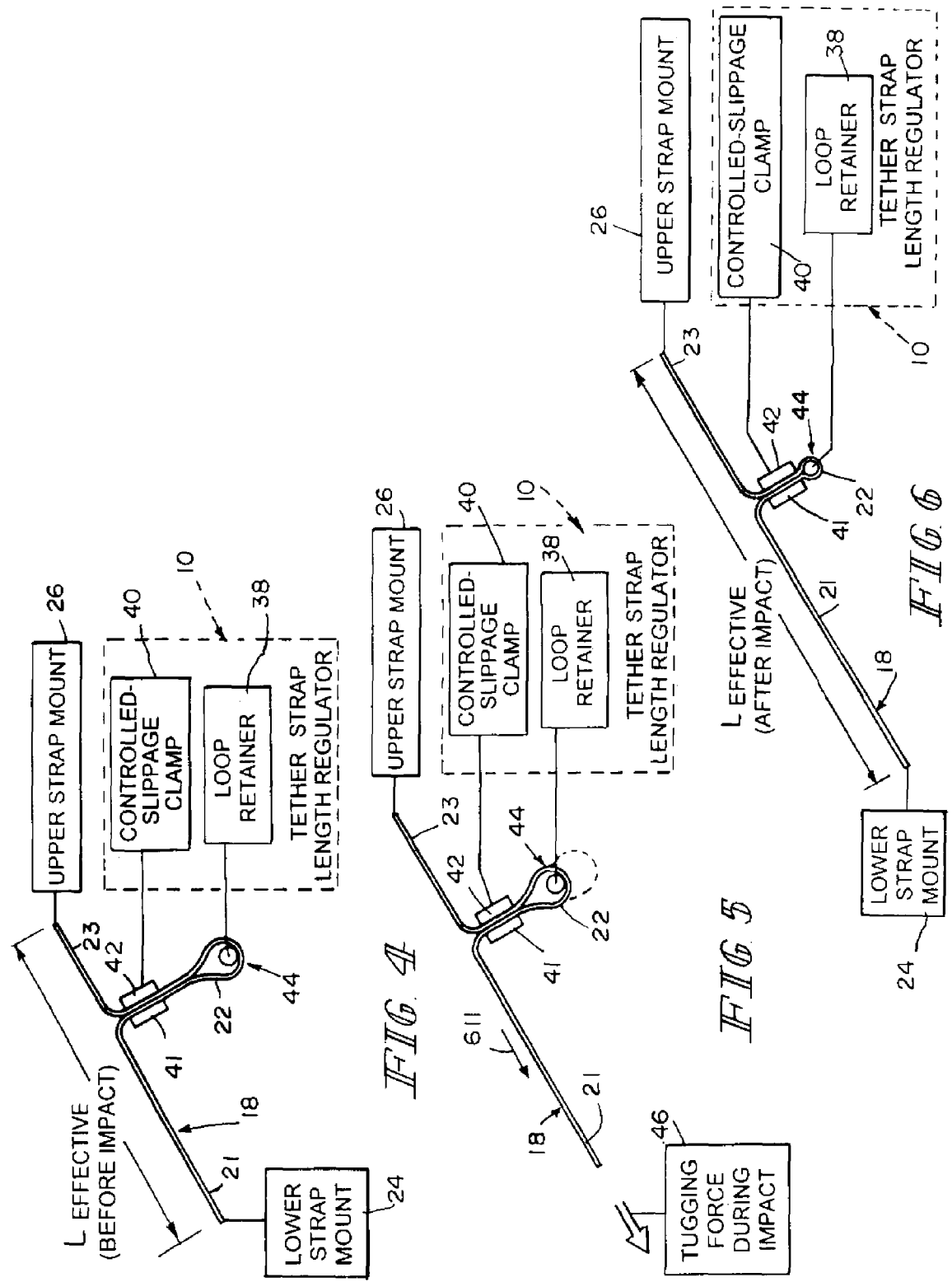

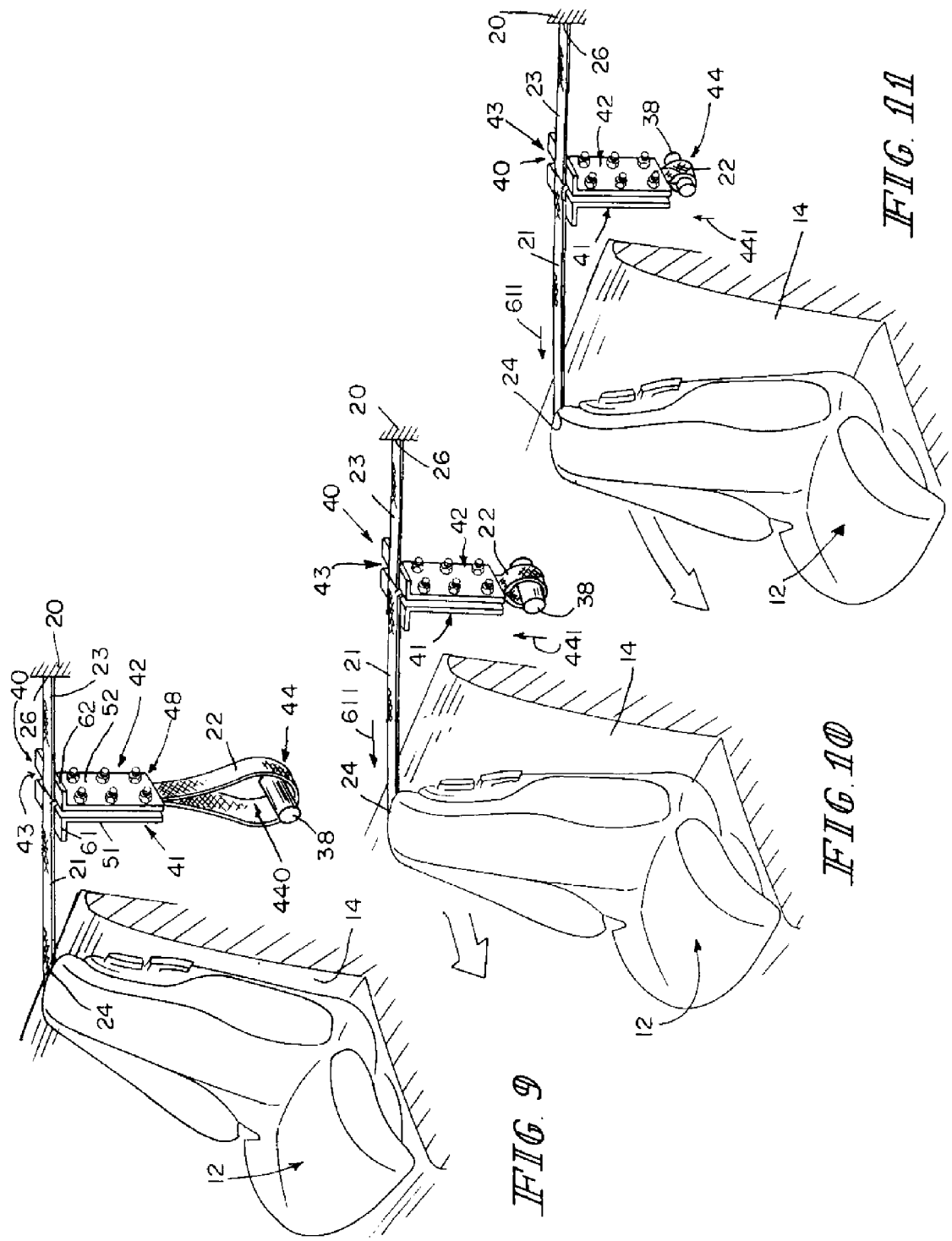

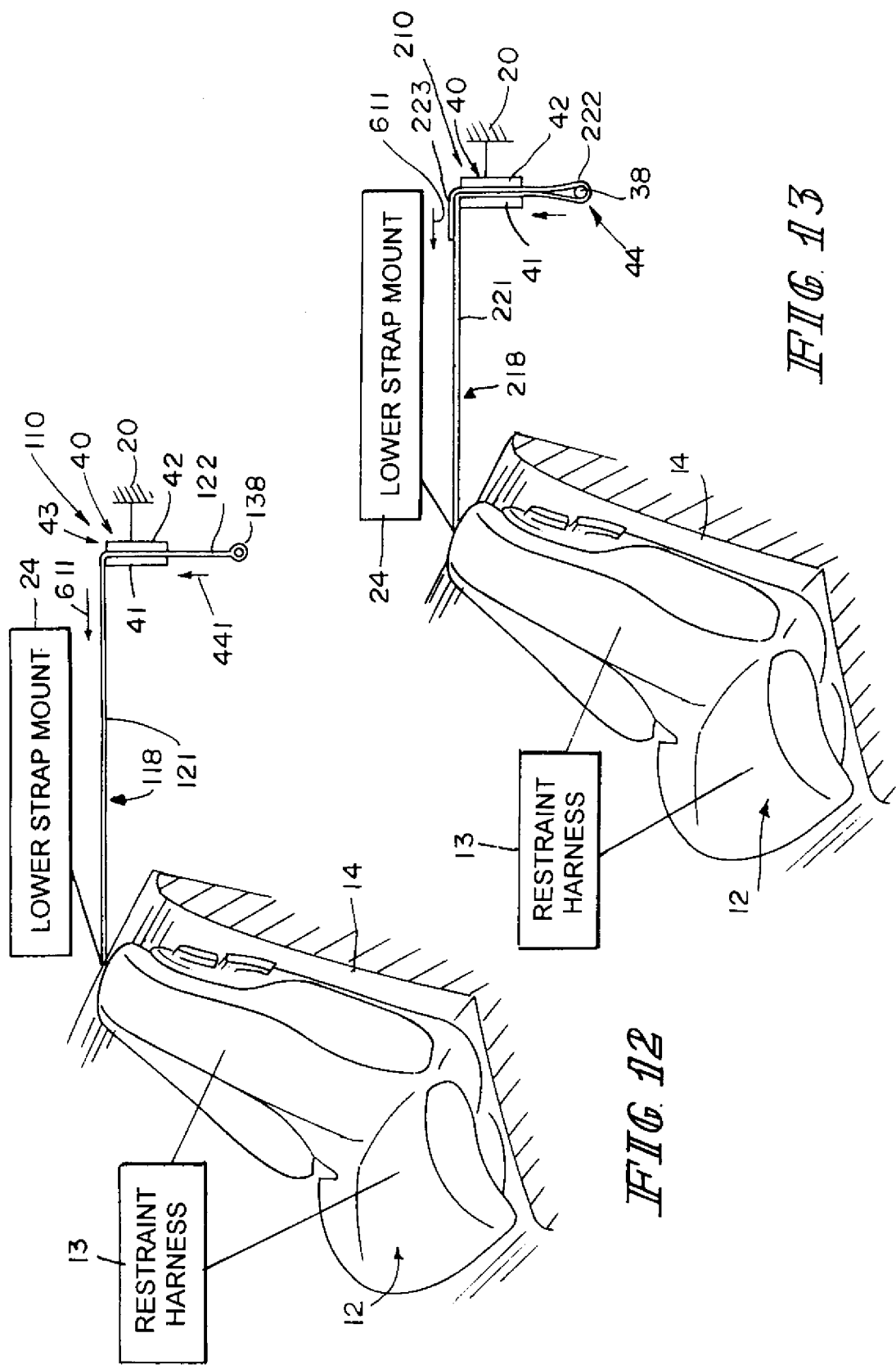

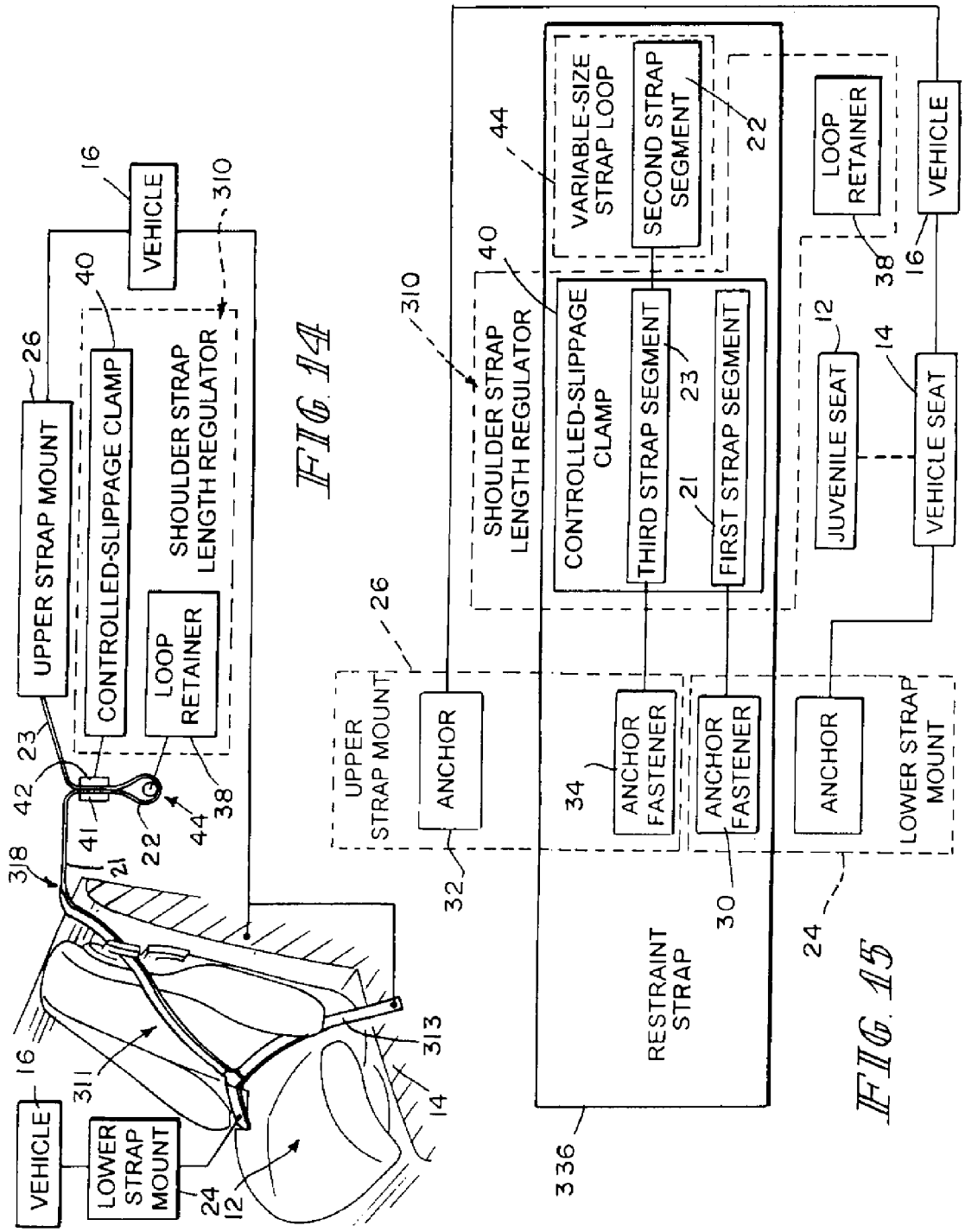

EXTENSIBLE RESTRAINT STRAP FOR AN OCCUPANT-RESTRAINT SYSTEM IN A VEHICLE

This application claims priority under 35 U.S.C. § 119(e) to U.S. Provisional Application Ser. No. 60/697,699, filed Jul. 8, 2005, which is expressly incorporated by reference herein.

BACKGROUND

The present disclosure relates to occupant-restraint systems, and in particular, to restraint systems for juveniles and adults in vehicles. More particularly, the present disclosure relates to a tether adapted to be coupled at one end to a juvenile vehicle seat and at another end to a tether anchor mounted in a vehicle and to a shoulder strap included in a restraint harness.

SUMMARY

According to the present disclosure, a controlled-slippage clamp is coupled to an extensible restraint strap. The controlled-slippage clamp is used to control the rate of deceleration of an occupant seated in a vehicle seat by extending the effective length of the restraint strap in a controlled manner during application of a tugging force to the restraint strap caused by a sudden stoppage or slowdown of the vehicle.

In illustrative embodiments, the controlled-slippage clamp includes first and second clamp members and a compressor. The clamp members are arranged to form a strap-receiving space therebetween. The compressor moves the clamp members together to clamp a restraint strap extending through the strap-receiving space. A predetermined clamping load is applied to the restraint strap to allow controlled slippage of the restraint strap in the controlled-slippage clamp in response to application of a tugging force to the restraint strap during sudden vehicle stoppage or slowdown. Such controlled slippage allows regulated "payout" of a reserve portion of the restraint strap to increase the effective length of the restraint strap and thereby control the rate of deceleration of a vehicle occupant and/or juvenile seat coupled to the restraint strap.

In one embodiment, the restraint strap is a tether strap coupled to a juvenile seat and to a frame in a vehicle. In another embodiment, the restraint strap is a shoulder strap included in an occupant-restraint harness suitable for use by adults seated on a vehicle seat and by juveniles seated on a juvenile (booster) seat placed on the vehicle seat.

Features of the present disclosure will become apparent to those skilled in the art upon consideration of the following detailed description of illustrative embodiments exemplifying the best mode of carrying out the disclosure as presently perceived.

BRIEF DESCRIPTION

The detailed description particularly refers to the accompanying figures in which:

FIG. 1 is a perspective view of a juvenile seat placed on a vehicle seat and a diagrammatic view of a tether strap length regulator for increasing the effective length of a tether strap used to tether the juvenile seat to the vehicle in a regulated manner during sudden vehicle stoppage or slowdown, wherein the tether strap length regulator comprises a controlled-slippage clamp coupled to two portions of the tether strap to establish a loop in the tether strap and a loop retainer arranged to extend through an retainer receiving opening defined by the loop;

FIG. 2 is a diagrammatic view of a vehicle comprising means in accordance with the present disclosure for controlling the rate of deceleration of an occupant seated in the juvenile seat and restrained by a restraint harness included in the juvenile seat during sudden vehicle stoppage or slowdown using a tether strap length regulator;

FIG. 4-6 illustrates diagrammatically how the effective length of the tether strap is increased in a regulated manner owing to controlled slippage of the tether strap in a clamp included in the tether strap length regulator;

Figure 3:
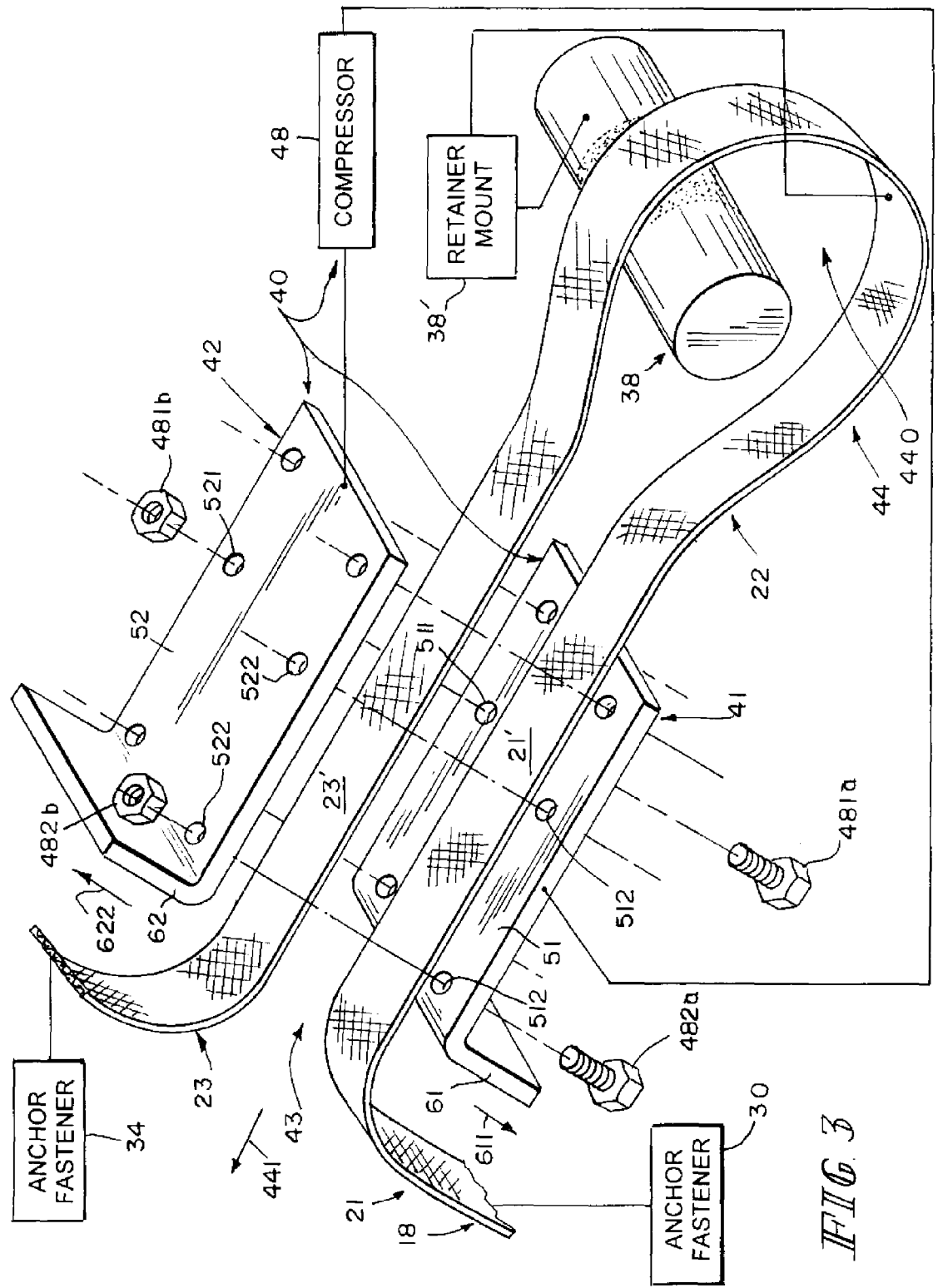
FIG. 3 is an exploded assembly view of an illustrative strap length regulator in accordance with the present disclosure suitable for use in regulating the effective length of a tether strap in a juvenile seat restraint system as shown in FIGS. 1-11 and a shoulder strap in an occupant restraint system as shown in FIGS. 12-16.
Figures 7, 8:
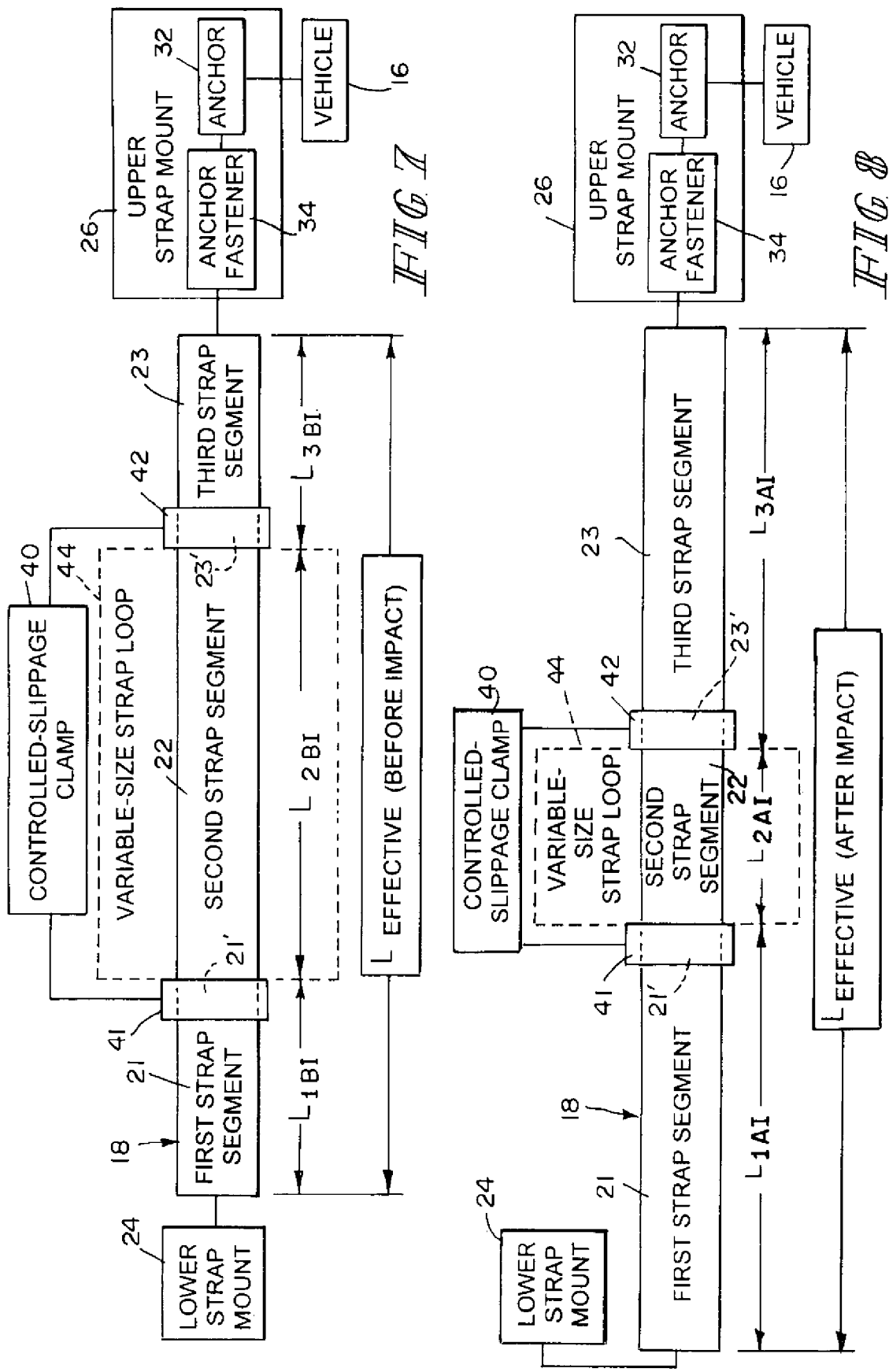
Figure 16:
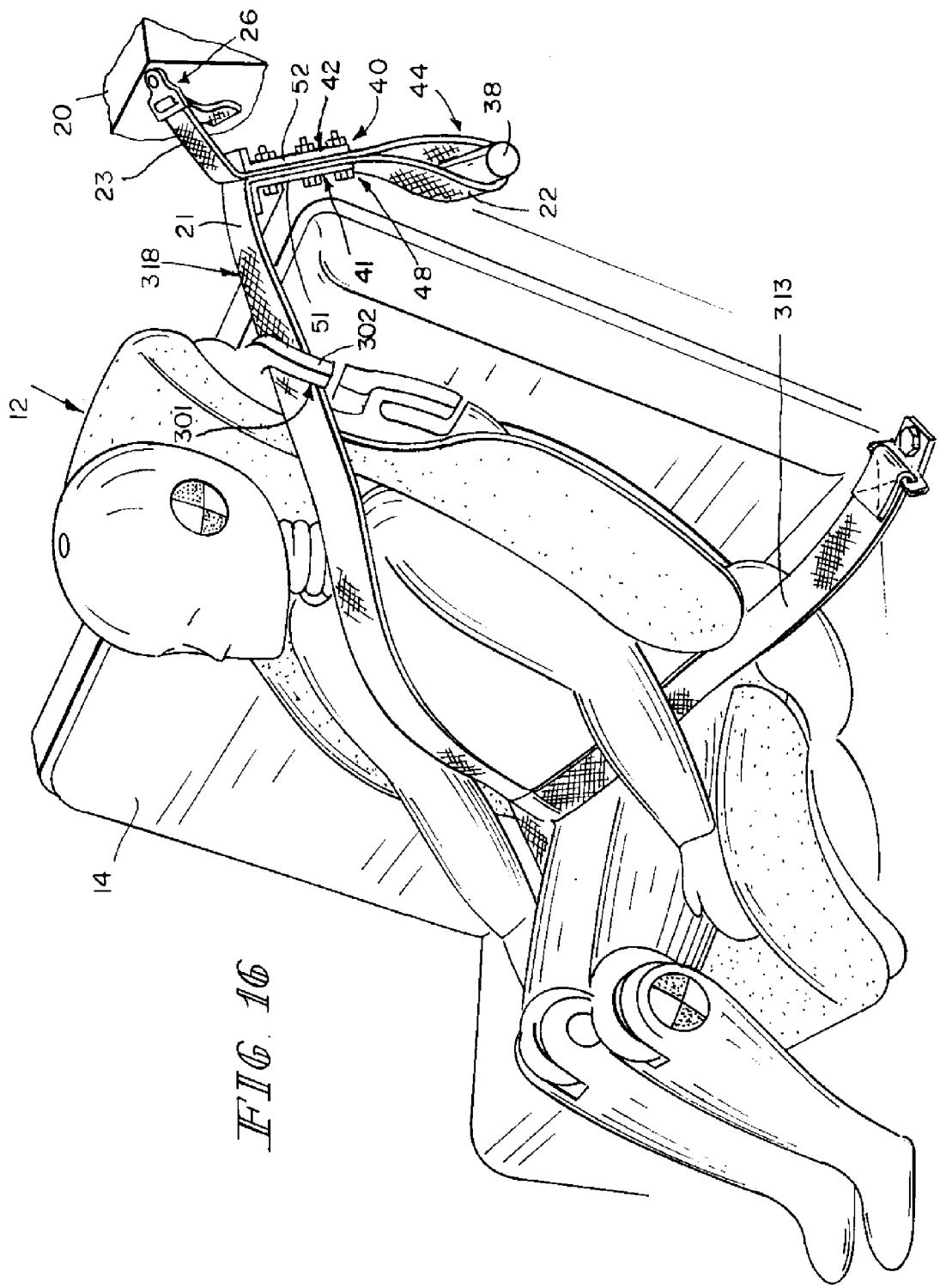
Figure 17:
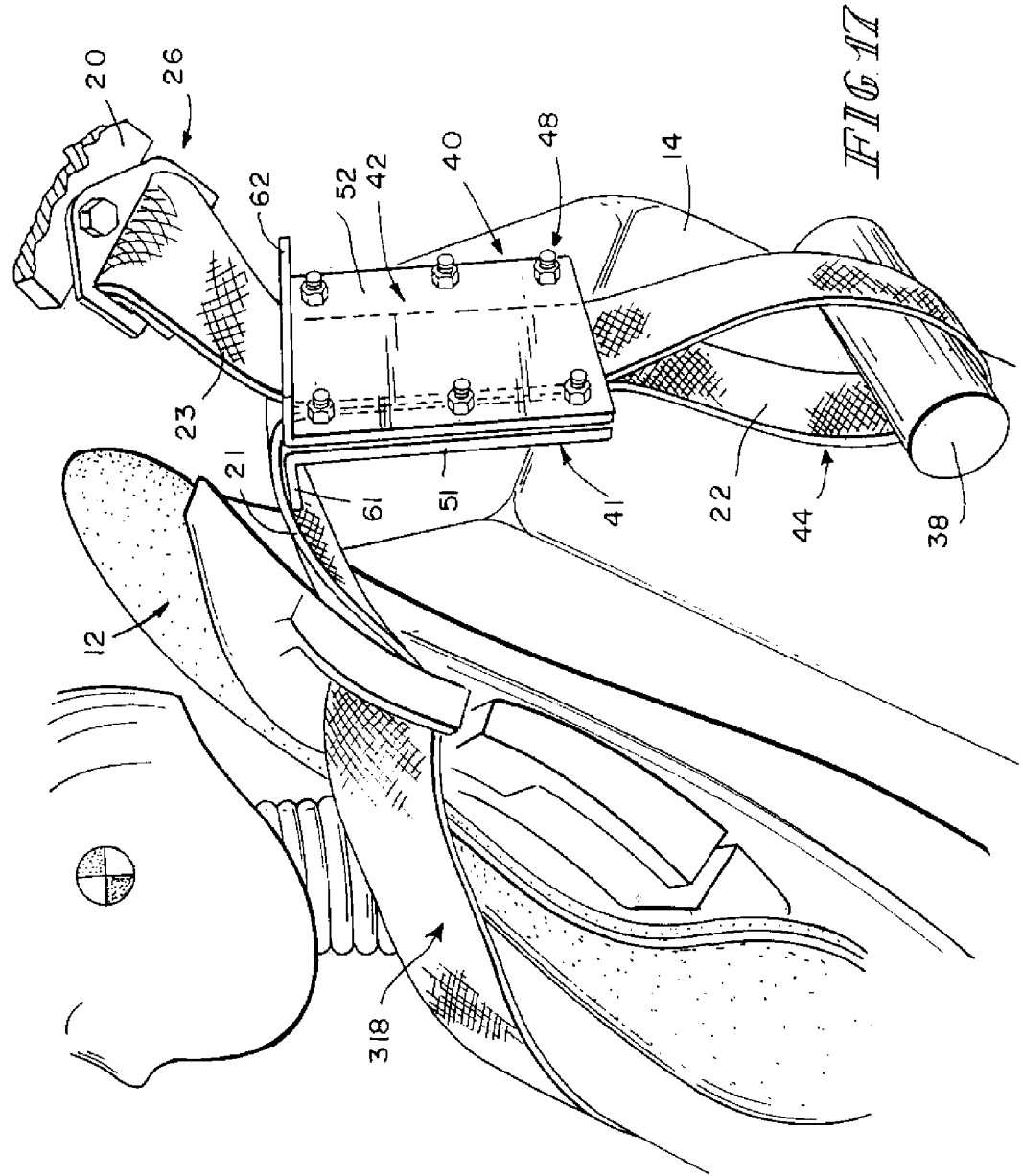
Figure 18:
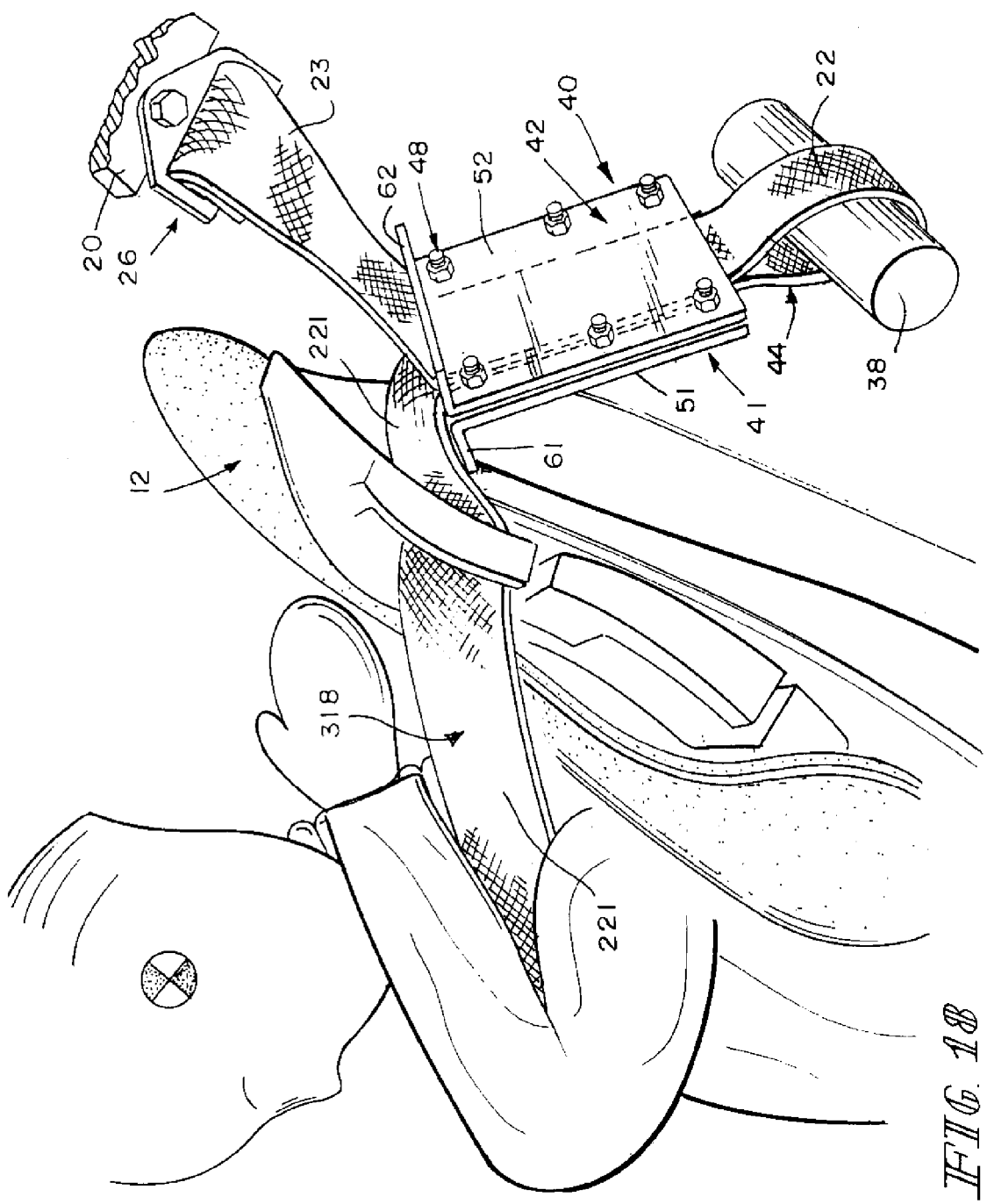

FIG. 4 is a diagrammatic view showing the effective length of the tether strap before impact (i.e., before sudden vehicle stoppage or slowdown) and showing that the loop is "large" owing to use of a relatively long length of the tether strap to form the loop and provides a "reserve portion" of restraint strap that can be "paid out" as the restraint strap is tugged and slips in the clamp to increase the "effective length" of the restraint strap;

FIG. 5 is a diagrammatic view showing a "tugging" force being applied to one end of the tether strap during impact to cause controlled slippage of the tether strap in the clamp, thereby pulling some of the reserve portion of the strap forming the loop through the clamp to reduce the size of the loop;

FIG. 6 is a diagrammatic view similar to FIG. 4 showing the increased effective length of the tether strap after impact (i.e., after sudden vehicle stoppage or slowdown) caused by more controlled slippage of the portion of the strap forming the loop through the clamp to reduce the size of the loop to a relatively small size;

FIG. 7 is a diagrammatic view showing the effective length of the tether strap "before impact" (i.e., before sudden vehicle stoppage or slowdown);

FIG. 8 is a diagrammatic view similar to FIG. 7 showing an increase in the effective length of the tether strap "after impact" owing to controlled slippage of the tether strap in the clamp sufficient to reduce the length of the second strap segment forming the loop;

FIG. 9 is a perspective view of the illustrative strap length regulator of FIG. 3 used to regulate the length of a juvenile seat tether strap of the type suggested in FIGS. 1 and 2 showing a relatively large loop formed in the tether strap before impact;

FIG. 10 is a view similar to FIG. 9 showing slippage of the tether strap in the clamp to shrink the size of the loop in the tether strap to a relatively smaller size so as to increase the effective length of the tether strap;

FIG. 11 is a view similar to FIGS. 9 and 10 showing further slippage of the tether strap to squeeze the loop retainer coupled to the loop in the tether strap and use of the loop retainer to block movement of all of the loop through the strap-receiving space-formed in the clamp;

FIG. 12 is a perspective view of a juvenile seat placed on a vehicle seat and a diagrammatic view of a tether strap length regulator in accordance with another embodiment of the present disclosure, wherein the tether strap length regulator comprises a controlled-slippage clamp coupled to ground (e.g., vehicle frame) and clamped to a tether strap coupled at one end to the juvenile seat;

FIG. 13 is a perspective view of the juvenile seat placed on a vehicle seat and a diagrammatic view of a tether strap regulator in accordance with yet another embodiment of the present disclosure, wherein the tether strap length regulator comprises a controlled-slippage clamp coupled to ground (e.g., vehicle frame) and clamped to two portions of a tether strap coupled at one end to the juvenile seat to form a loop in the tether strap;

FIG. 14 is a perspective view of an occupant-restraint harness associated with a vehicle seat and matched with a juvenile seat placed on the vehicle seat and a diagrammatic view of a shoulder strap length regulator for increasing the effective length of the shoulder strap included in the occupant-restraint harness in a regulated manner during sudden vehicle stoppage or slowdown, wherein the shoulder strap length regulator comprises a controlled-slippage clamp coupled to two portions of the shoulder strap to establish a loop in the shoulder strap and a loop retainer coupled to the vehicle and arranged to extend through a retainer-receiving opening defined by the loop;

FIG. 15 is a diagrammatic view of a vehicle comprising means in accordance with the present disclosure for controlling the rate of deceleration of an occupant seated in a vehicle and restrained by a restraint harness during sudden vehicle stoppage or slowdown using a shoulder strap length regulator;

FIG. 16 is a perspective view of an occupant-restraint harness in accordance with another illustrative embodiment of the present disclosure wherein the occupant-restraint harness comprises a shoulder strap and a controlled-slippage clamp coupled to the shoulder strap to form a loop mating with a loop retainer and showing the shoulder strap and a relatively large loop before impact;

FIG. 17 is an enlarged perspective view of the relatively large loop formed in the shoulder strap before impact; and FIG. 18 is a perspective view similar to FIG. 17 showing slippage of the shoulder strap in the clamp to "shrink" the size of the loop in the shoulder strap to a relatively smaller size so as to increase the effective length of the shoulder strap.

DETAILED DESCRIPTION

A strap length regulator in accordance with the present disclosure is used in an occupant-restraint system provided onboard a vehicle to increase the effective length of a restraint strap included in the occupant-restraint system during sudden vehicle stoppage or slowdown. Such a controlled variation in the effective length of the restraint strap controls the rate of deceleration of an adult or juvenile restrained by the restraint strap after sudden vehicle stoppage or slowdown.

In one set of embodiments, a tether strap length regulator is provided to regulate the effective length of a tether strap used to tether a juvenile seat to a vehicle as suggested, for example, in FIGS. 1-13. In another set of embodiments, a shoulder strap length regulator is provided to regulate the effective length of a shoulder strap included in an occupant-restraint harness provided in a vehicle and adapted to restrain an adult seated on a vehicle seat and a child seated on a juvenile (booster) seat placed on the vehicle seat as suggested, for example, in FIGS. 14-18.

As suggested in FIGS. 1 and 2, a tether strap length regulator 10 is associated with a juvenile (booster) seat 12 provided with a three-point or five-point or other restraint harness 13 and placed on a vehicle seat 14 in a vehicle 16. A tether strap 18 is coupled to juvenile seat 12 and a frame 20 of vehicle 16 is used to tether juvenile seat 12 to vehicle frame 20 as suggested in FIG. 1. In an illustrative embodiment, tether strap 18 is an elongated and monolithic web comprising, in series, first, second, and third strap segments 21, 22, and 23.

One free end of first strap segment 21 is coupled to lower strap mount 24 and one free end of third strap segment 23 is coupled to upper strap mount 26 as suggested in FIG. 1. Lower strap mount 24 includes a lower anchor 28 coupled to juvenile seat 12 and a lower anchor fastener 30 coupled to first strap segment 21 and configured to mate with lower anchor 28 to facilitate coupling of tether strap 18 to lower anchor 28. Upper strap mount 26 includes an upper anchor 32 coupled to vehicle frame 20 and an upper anchor fastener 34 coupled to third strap segment 23 and configured to mate with upper anchor 32 to facilitate coupling of tether strap 18 to upper anchor 32. As suggested in FIG. 2, lower anchor fastener 30, first, second, and third strap segments 21, 22, and 23 (i.e., tether strap 18), and upper anchor fastener 34 cooperate to define a restraint strap 36.

Tether strap length regulator 10 comprises a controlled-slippage clamp 40 and a loop retainer 38 as suggested diagrammatically in FIGS. 1, 2, and 4-6 and illustratively in FIGS. 3 and 9-11. Controlled-slippage clamp 40 is coupled to portions 21' and 23' of first and third strap segments 21, 23 to form a variable-size strap loop 44 in tether belt 18 comprising second strap segment 22. It should be noted that the length of second strap segment 22 varies as a function of the size of variable-size strap loop 44 as suggested diagrammatically in FIGS. 4-8 and illustratively in FIGS. 9-11.

Controlled-slippage clamp 40 is configured to compress a portion 21' of first strap segment 21 and a portion 23' of third strap segment 23 at a predetermined clamping load as suggested in FIGS. 3, 7, and 8. This clamping load is predetermined to allow controlled slippage of tether strap or web 18 in the controlled-slippage clamp 40 in response to application of a tugging force 46 (see, e.g., FIG. 5) to first strap segment 21 to reduce variable-size strap loop 44 in size and to increase an effective length of tether strap 18 and restraint strap 36 as suggested, for example, in FIGS. 4-6, 7, and 8. In an illustrative embodiment, tugging force 46 is greater than 500 pounds and the clamping load is about 500 pounds.

Controlled-slippage clamp 40 includes first and second clamp members 41, 42 and a "compressor" 48 as suggested, for example, in FIG. 3. First and second clamp members 41, 42 are arranged to lie in confronting relation to one another to define a strap-receiving space 43 therebetween containing portions 21' and 23' of first and third strap segments 21, 23. Compressor 48 is configured to provide means for moving first and second clamp members 41, 42 toward one another to apply the predetermined clamping load to portions 21' and 23' of first and third strap segments 21, 23 extant in strap-receiving space 43 so that tether strap 18 slips between first and second clamp members 41, 42 to increase the effective length of restraint strap 36 in response to application of a predetermined tugging force 46 to first strap segment 21 to control deceleration of juvenile seat 12 during and after sudden vehicle stoppage or slowdown.

First clamp member 41 includes a first plate 51 as suggested in FIG. 3. Second clamp member includes a second plate 52 cooperating with first plate 51 to define strap-receiving space 43 therebetween. Portion 21' of first strap segment 21 contacts first plate 51 as suggested in FIG. 3. Portion 23' of third strap segment 23 contacts second plate 52 and portion 21' of first strap segment 21 to lie sandwiched therebetween as also suggested in FIG. 3. It is within the scope of this disclosure to arrange first and third strap segments 21, 23 in a spaced-apart side-by-side relation in strap-receiving space 43 so that each of first and third segments contacts first and second plates 51, 52.

First plate 51 is formed to include a first aperture 511. Second plate 52 is formed to include a first aperture 521 arranged to lie in alignment with first aperture 511 formed in first plate 51. In an illustrative embodiment, compressor 48 includes a first bolt 481a and a companion first nut 481b. In the illustrated embodiment, first plate 51 is formed to include a row of three first apertures 511 as suggested in FIG. 3.

Compressor 48 includes a first bolt 481a arranged to extend through first apertures 511, 521 formed in first and second plates 51, 52. First nut 481b is coupled to first bolt 481a and tightened to draw first and second plates 51, 52 toward one another to apply the predetermined clamping load to portions 21' and 23' of first and third segments 21, 23 located in strap-receiving space 43 defined between first and second plates 51, 52.

First plate 51 is also formed to include a second aperture 512 arranged to lie in laterally spaced-apart relation to first aperture 511 formed in first plate 37 to locate portion 21' of first strap segment 21 therebetween. Second plate 52 is formed to include a second aperture 522 arranged to lie in laterally spaced-apart relation to first aperture 521 formed in second plate 52 to locate portion 23' of third strap segment 23 therebetween. In the illustrated embodiment, first plate 51 is formed to include a row of three second apertures 512 arranged to lie in spaced-apart parallel relation to the row of three first apertures 511 as suggested in FIG. 3.

Compressor 48 further includes a second bolt 482a arranged to extend through second apertures 512, 522 formed in first and second plates 51, 52 and a companion second nut 482b coupled to second bolt 481a. Second nut 482a is tightened to draw first and second plates 51, 52 toward one another to cooperate with first nut 481b and bolt 481a to apply the predetermined clamping load to portions 21' and 23' of first and third strap segments 21, 23 located in strap-receiving space 43 defined between first and second plates 51, 52.

First clamp member 41 further includes a first flange 61 coupled to first plate 51 to locate first plate 51 between first flange 61 and variable-size strap loop 44 as suggested in FIG. 3. First flange 61 is arranged to lie at an angle of, for example, about 90° relative to first plate 51 to provide means for guiding first strap segment 21 as first strap segment 21 enters and exits strap-receiving space 43 defined between first and second plates 51, 52. First flange 61 extends in a first direction 611 away from first plate 51.

Second clamp member 42 further includes a second flange 62 coupled to second plate 52 to locate second plate 52 between second flange 62 and variable-size strap loop 44 as suggested in FIG. 3. Second clamp member 42 is arranged to extend in a second direction 622 generally opposite to first direction 611 and to lie at an angle of, for example, about 90° relative to second plate 52 to provide means for guiding third strap segment 23 as third strap segment 23 enters and exits strap-receiving space 43 defined between first and second plates 51, 52.

Loop retainer 38 is coupled to variable-size strap loop 44 and arranged to block movement of all of variable-size strap loop 44 established by second strap segment 22 in an outward direction 441 through strap-receiving space 43 defined between first and second clamp members 41, 42 in response to movement of at least one of first and third strap segments 21, 23 in first direction 441. Variable-size strap loop 44 is formed to include a retainer-receiving opening 440 and loop retainer 38 is arranged to extend through the retainer-receiving opening 440 as suggested in FIG. 3.

A retainer mount 38' is provided to couple loop retainer 38 to a portion of second strap segment 22 of tether strap 18 as suggested diagrammatically in FIG. 3. In illustrative embodiments, retainer mount comprises a hook-and-loop fastener, an adhesive, or other suitable fastener.

Loop retainer 38 is made of a deformable material in an illustrative embodiment and is configured to deform under a squeezing load applied by variable-size strap loop 44 in response to a reduction in size of variable-size strap loop 44 owing to slippage of the tether strap or web 18 in strap-receiving space 43 defined by first and second clamp members 41, 42 to increase the effective length of restraint strap 36. Loop retainer 38 is arranged to move to engage at least one of first and second clamp members 41, 42 to block movement of all of variable-size strap loop 44 through strap-receiving space 43 in response to said reduction in size of variable-size strap loop 44 so that all of second strap segment 22 is never pulled through strap-receiving space 43 during application of tugging force 46 to first strap segment 21 to disengage tether strap 18 from controlled-slippage clamp 40 during sudden vehicle stoppage or slowdown.

As suggested diagrammatically in FIGS. 4-6, the effective length of tether strap 18 (and restraint strap 36) changes during and after sudden vehicle stoppage or slowdown under the control of tether strap length regulator 10. Initially, before impact (i.e., sudden vehicle stoppage or slowdown), the "size" of variable-size strap loop 44 defined by second strap segment 22 is relatively large owing to the relatively long length of second strap segment 22. Tugging force 46 is applied to first strap segment 21 of tether strap 18 during impact owing to forward movement of juvenile seat 12 (and an occupant seated therein) relative to vehicle seat 14 caused by sudden vehicle stoppage or slowdown. Tugging force 46 pulls first strap segment 21 in direction 611 to cause slippage of tether strap 18 ins trap-receiving space 43 in controlled-slippage clamp 40. A portion of second strap segment 22 is drawn into and through strap-receiving space 43 in clamp 40 and this portion is "converted" into first strap segment 21. Such "conversion," in effect, decreases the length of second strap segment 22 to reduce the size of variable-size strap loop 44 and increases the length of first strap segment 21 to increase the effective length of tether strap 18 (and restraint strap 36). By increasing the effective length of tether strap 18 in a measured, controlled, and regulated manner during sudden vehicle stoppage or slowdown, the rate of deceleration of juvenile seat 12 (and its occupant) is controlled.

It will be understood that second strap segment 22 is "paid out" through controlled-slippage clamp 40 during impact to increase the effective length of tether strap 18 (and restraint strap 36) as suggested in FIGS. 7 and 8. As suggested in FIG. 7, before impact, first strap segment 21 has an initial length $L_{1B1}$ and second strap segment 22 has an initial length $L_{2B1}$. As suggested in FIG. 7, after impact, first strap segment 21 has a final length $L_{1A1}$ that is greater than initial length $L_{1B1}$ and second strap segment 22 has a final length $L_{2A1}$ lesser than initial length $L_{2B1}$. "Shrinkage" of variable-size strap loop 44 resulting from controlled slippage of tether strap 18 in controlled-slippage clamp 40 is illustrated, for example, in FIGS. 9-11.

In the embodiment of FIG. 12, a tether strap length regulator 110 mates with a tether strap 118 including a first strap segment 121 and a second strap segment 122. Tether strap length regulator 110 comprises a controlled-slippage clamp 40 coupled in a suitable manner to vehicle frame 20. Second strap segment 122 is configured to be drawn into a strap-receiving space 43 formed in controlled-slippage clamp 40 during sudden vehicle stoppage or slowdown. Tether strap length regulator 110 further comprises a second strap segment retainer 138 defined, for example, by a small loop formed at a free end of second strap segment 122 to provide means for blocking movement of all of second strap segment 122 through strap-receiving space 43 during sudden vehicle stoppage or slowdown. It is within the scope of this disclosure to use retainer 38 disclosed herein and shown in FIG. 3 to provide second strap segment retainer 138.

In the embodiment of FIG. 13, a tether strap length regulator 210 mates with a tether strap 218 including, in series, first strap segment 221, second strap segment 222, and third strap segment 223. Third strap segment 223 is coupled to first strap segment 221 and second strap segment 222 is arranged to define a variable-size strap loop 44. Tether strap length regulator 210 comprises a controlled-slippage clamp 40 coupled in a suitable manner to vehicle frame 20 and clamped to portions of first and third strap segments 221, 223. Second strap segment 222 is configured to be drawn into a strap-receiving space 43 in controlled-slippage or slowdown. Tether strap length regulator further comprises a loop retainer 38 coupled to second strap segment 222 and configured to block movement of all of variable-size strap loop 44 through strap-receiving space during sudden vehicle stoppage or slowdown.

As suggested in FIGS. 14 and 15, a shoulder strap length regulator 310 is associated with an occupant-restraint harness 311 provided for a vehicle seat 14 included in a vehicle 16. Shoulder strap length regulator 310 is configured to regulate the effective length of a shoulder strap 18 included in occupant-restraint harness 311 provided in vehicle 16 and adapted to restrain an adult (not shown) seated on a vehicle seat and a child (not shown) seated on a juvenile (booster) seat placed on vehicle seat 14. Occupant-restraint harness 311 also includes a lap belt 313.

Shoulder strap length regulator 310 comprises the controlled-slippage clamp 40 and loop retainer 38 disclosed herein. By controlling the effective length of shoulder strap 18, shoulder strap length regulator 310 functions during and after sudden vehicle stoppage or slowdown to control deceleration of the person and, if any, juvenile seat 12 associated with shoulder strap 18. Whereas tether strap length regulator 10 controls the effective length of tether strap 18, shoulder strap length regulator 310 controls the effective length of shoulder strap 318 (and restraint strap 336) in a similar manner.

Controlled-slippage clamp 40 is coupled to shoulder strap 318 to form a variable-size strap loop 44 as shown, for example, in FIG. 16. Before impact, as shown in FIG. 17, variable-size strap loop 44 has a relatively large size. After impact, as shown in FIG. 18, variable-size strap loop 44 has a relatively small size for reasons disclosed herein. In the illustrated embodiment, first strap segment 21 if shoulder strap 318 passes through a guide channel 301 formed in a strap guide 302 included in juvenile seat 12.

The invention claimed is:

1. An occupant-restraint system for use in a vehicle, the system comprising an extensible restraint strap including an upper anchor fastener adapted to be coupled to an upper anchor included in a vehicle, a lower anchor fastener adapted to be coupled to a lower anchor arranged to lie in spaced-apart relation to the upper anchor, and a web interconnecting the upper and lower anchor fasteners, the web including a first strap segment coupled to the lower anchor fastener, a third strap segment coupled to the upper anchor fastener, and a second strap segment interconnecting the first and third strap segments, and a controlled-slippage clamp coupled to portions of the first and third strap segments to form a variable-size web loop comprising the second strap segment and configured to compress the portions of the first and third strap segments at a predetermined clamping load to allow controlled slippage of the web in the controlled-slippage clamp in response to application of a tugging force to the first strap segment to reduce the variable-size web loop in size and to increase an effective length of the extensible restraint strap.

2. The system of claim 1, wherein the controlled-slippage clamp includes first and second clamp members arranged to lie in confronting relation to one another to define a strap-receiving space therebetween containing the portions of the first and third strap segments, and a compressor configured to move the first and second clamp members toward one another to apply the predetermined clamping load to the portions of the first and third strap segments extant in the strap-receiving space.

3. The system of claim 2, wherein the first clamp member includes a first plate, the second clamp member includes a second plate cooperating with the first plate to define the strap-receiving space therebetween, the portion of the first strap segment contacts the first plate, and the portion of the third strap segment contacts the second plate and the portion of the first strap segment to lie sandwiched therebetween.

4. The system of claim 3, wherein the first plate is formed to include a first aperture, the second plate is formed to include a first aperture arranged to lie in alignment with the first aperture formed in the first plate, and the compressor includes a first bolt arranged to extend through the first apertures formed in the first and second plates and a first nut coupled to the first bolt and tightened to draw the first and second plates toward one another to apply the predetermined clamping load to the portions of the first and third segments located in the strap-receiving space defined between the first and second plates.

5. The system of claim 4, wherein the first plate is formed to include a second aperture arranged to lie in laterally spaced-apart relation to the first aperture formed in the first plate to locate the portion of the first strap segment therebetween, the second plate is formed to include a second aperture arranged to lie in laterally spaced-apart relation to the first aperture formed in the second plate to locate the portion of the third strap segment therebetween, and the compressor further includes a second bolt arranged to extend through the second apertures formed in the first and second plates and a second nut coupled to the second bolt and tightened to draw the first and second plates toward one another to cooperate with the first nut and bolt to apply the predetermined clamping load to the portions of the first and third strap segments located in the strap-receiving space defined between the first and second plates.

6. The system of claim 3, wherein the first clamp member further includes a first flange coupled to the first plate to locate the first plate between the first flange and the web loop and arranged to lie at an angle relative to the first plate to provide means for guiding the first strap segment as the first strap segment enters and exits the strap-receiving space defined between the first and second plates.

7. The system of claim 6, wherein the angle is about 90°.

8. The system of claim 6, wherein the first flange extends in a first direction away from the first plate, and the second clamp member further includes a second flange coupled to the second plate to locate the second plate between the second flange and the web loop and arranged to extend in a second direction generally opposite to the first direction and to lie at an angle relative to the second plate to provide means for guiding the third strap segment as the third strap segment enters and exits the strap-receiving space defined between the first and second plates.

9. The system of claim 3, wherein the first clamp member further includes a first flange coupled to the first plate, the second clamp member further includes a second flange coupled to the second plate, each of the first and second clamp members is L-shaped, and the first and second clamp members are oriented to lie in back-to-back relation to one another to provide the controlled-slippage clamp with a T-shaped profile.

10. The system of claim 9, wherein the first plate is formed to include a first aperture, the second plate is formed to include a first aperture arranged to lie in alignment with the first aperture formed in the first plate, and the compressor includes a first bolt arranged to extend through the first apertures formed in the first and second plates and a first nut coupled to the first bolt and tightened to draw the first and second plates toward one another to apply the predetermined clamping load to the portions of the first and third segments located in the strap-receiving space defined between the first and second plates.

11. The system of claim 10, wherein the first plate is formed to include a second aperture arranged to lie in laterally spaced-apart relation to the first aperture formed in the first plate to locate the portion of the first strap segment therebetween, the second plate is formed to include a second aperture arranged to lie in laterally spaced-apart relation to the first aperture formed in the second plate to locate the portion of the third strap segment therebetween, and the compressor further includes a second bolt arranged to extend through the second apertures formed in the first and second plates and a second nut coupled to the second bolt and tightened to draw the first and second plates toward one another to cooperate with the first nut and bolt to apply the predetermined clamping load to the portions of the first and third strap segments located in the strap-receiving space defined between the first and second plates.

12. The system of claim 2, further comprising a loop retainer coupled to the variable-size web loop and arranged to block movement of all of the variable-size web loop established by the second strap segment in a first direction through the strap-receiving space defined between the first and second clamp members in response to movement of at least one of the first and third strap segments in the first direction.

13. The system of claim 12, wherein the variable-size web loop is formed to include a retainer-receiving opening and the loop retainer is arranged to extend through the retainer-receiving opening.

14. The system of claim 13, wherein the loop retainer is made of a deformable material and is configured to deform under a squeezing load applied by the variable-size web loop in response to a reduction in size of the variable-size web loop owing to slippage of the web in the strap-receiving space defined by the first and second clamp members to increase the effective length of the restraint strap and the loop retainer is arranged to move to engage at least one of the first and second clamp members to block movement of all of the variable-size web loop through the strap-receiving space in response to said reduction in size of the variable-size web loop.

15. The system of claim 1, in combination with a vehicle including a frame and a vehicle seat, a juvenile seat placed on the vehicle seat, and a lower anchor coupled to the juvenile seat, and wherein the upper anchor fastener of the restraint strap is coupled to an upper anchor coupled to the frame of the vehicle and the lower anchor fastener of the restraint strap is coupled to the lower anchor to tether the juvenile seat to the frame of the vehicle.

16. The system of claim 1, in combination with a vehicle including a frame, upper and lower anchors coupled to the frame, and a vehicle seat, and wherein the restraint strap is a shoulder strap adapted to pass over a shoulder of an occupant seated on the vehicle seat, the upper anchor fastener is coupled to the upper anchor, and the lower anchor fastener is coupled to the lower anchor.

17. The system of claim 16, in further combination with a juvenile seat placed on the vehicle seat and formed to include a strap guide channel arranged to slidably receive another portion of the first strap segment therein.

18. An occupant-restraint system for use in a vehicle, the system comprising
a restraint strap including an anchor fastener adapted to be coupled to an anchor included in a juvenile seat and a web including a first strap segment coupled to the anchor fastener and a second strap segment coupled to the first strap segment, and
a controlled-slippage clamp coupled to a portion of the first strap segment and configured to compress the portion of the first strap segment at a predetermined clamping load normally to establish a web section comprising only the first strap segment extending between the anchor fastener and the controlled-slippage clamp and to define an effective length of the web section to allow controlled slippage of the web in the controlled-slippage clamp in response to application of a tugging force to the first strap segment to increase the effective length of the web section by using the first strap segment and at least a portion of the second strap segment to define the web section.

19. The system of claim 18, wherein the controlled-slippage clamp includes first and second clamp members arranged to lie in confronting relation to one another to define a strap-receiving space therebetween containing the portion of the first strap segment and a compressor configured to move the first and second clamp members toward one another to apply the predetermined clamping load to the portion of the first strap segment extant in the strap-receiving space.

20. The system of claim 19, wherein the first clamp member includes a first plate, the second clamp member includes a second plate cooperating with the first plate to define the strap-receiving space therebetween, and the portion of the first strap segment is positioned to lie sandwiched between the first and second plates.

21. The system of claim 19, further comprising a retainer coupled to the second strap segment and arranged to block movement of all of the second strap segment in a first direction through the strap-receiving space defined between the first and second clamp members in response to movement of the first strap segment in the first direction.

22. The system of claim 18, further comprising means for coupling the controlled-slippage clamp to a frame included in the vehicle to limit movement of the controlled-slippage clamp relative to the vehicle during application of the tugging force to the first strap segment.

23. The system of claim 18, wherein the web further includes a third strap segment, the second strap segment interconnects the first and third strap segments, and the controlled-slippage clamp is coupled to portions of the first and third strap segments to form a variable-size web loop comprising the second strap segment and configured to compress portions of the first and third strap segments at the predetermined clamping load.

24. The system of claims 23, wherein the controlled-slippage clamp includes first and second clamp members arranged to lie in confronting relation to one another to define a strap-receiving space therebetween containing the portions of the first and third strap segments, and a compressor configured to move the first and second clamp members toward one another to apply the predetermined clamping load to the portions of the first and third strap segments extant in the strap-receiving space.

25. The system of claim 24, wherein the first clamp member includes a first plate, the second clamp member includes a second plate cooperating with the first plate to define the strap-receiving space therebetween, the portion of the first strap segment contacts the first plate, and the portion of the third strap segment contacts the second plate and the portion of the first strap segment to lie sandwiched therebetween.

26. The system of claim 23, comprising a retainer coupled to the second strap segment and arranged to block movement of all of the second strap segment in a first direction through the strap-receiving space defined between the first and second clamp members in response to movement of the first strap segment in the first direction.

27. The system of claim 23, further comprising means for coupling the controlled-slippage clamp to a frame included in the vehicle to limit movement of the controlled-slippage clamp relative to the vehicle during application of the tugging force to the first strap segment.

28. An occupant-restraint system for use in a vehicle, the system comprising
an occupant-restraint harness including a shoulder strap and a controlled-slippage clamp coupled to the shoulder strap to establish, in series, first, second, and third strap segments, in the shoulder strap, wherein portions of the first and third strap segments are arranged to lie in a strap-receiving space formed in the controlled-slippage clamp and wherein the second strap segment interconnects the first and third strap segments and forms a loop.

29. The system of claim 28, further comprising a loop retainer and wherein the loop retainer is coupled to the loop to block movement of all of the loop established by the second strap segment in a first direction through the strap-receiving space formed in the clamp in response to movement of at least one of the first and third shoulder strap segments in the first direction.

30. The system of claim 28, wherein the controlled-slippage clamp includes a first plate, a second plate arranged to lie in confronting relation to the first plate to define the strap-receiving space therebetween, and a compressor configured to move the first and second plates toward one another to apply a predetermined clamping load to the portions of the first and third strap segments arranged to lie in the strap-receiving space to regulate slippage of the first and third strap segments between the first and second plates during application of a tugging force to another portion of the first strap segment located outside of the strap-receiving space formed in the controlled-slippage clamp.

31. The system of claim 30, wherein the predetermined clamping load is about 500 pounds and the tugging force is greater than 500 pounds.

32. The system of claim 30, wherein the controlled-slippage clamp further includes a first flange coupled to the first plate to locate the first plate between the first flange and the loop and arranged to lie at an angle relative to the first plate to provide means for guiding the first strap segment as the first strap segment enters and exits the strap-receiving space defined between the first and second plates.

33. The system of claim 32, wherein the angle is about 90°.

34. The system of claim 32, wherein the first flange extends in a first direction away from the first plate, the controlled-slippage clamp further includes a second flange coupled to the second plate to locate the second late between the second flange and the loop and arranged to extend in a second direction generally opposite to the first direction and to lie at an angle relative to the second plate to provide means for guiding the third strap segment as the third step segment enters and exits the strap-receiving space defined between the first and second plates.

35. The system of claim 32, wherein the first plate is formed to include a first aperture, the second plate is formed to include a first aperture arranged to lie in alignment with the first aperture, and the compressor includes a bolt arranged to extend through the first apertures formed in the first and second plates and a nut coupled to the bolt and tightened to draw the first and second plates toward one another to apply the predetermined clamping load to the portions of the first and third strap segments located in the strap-receiving space.

* * * * *